UNITED STATES PATENT OFFICE.

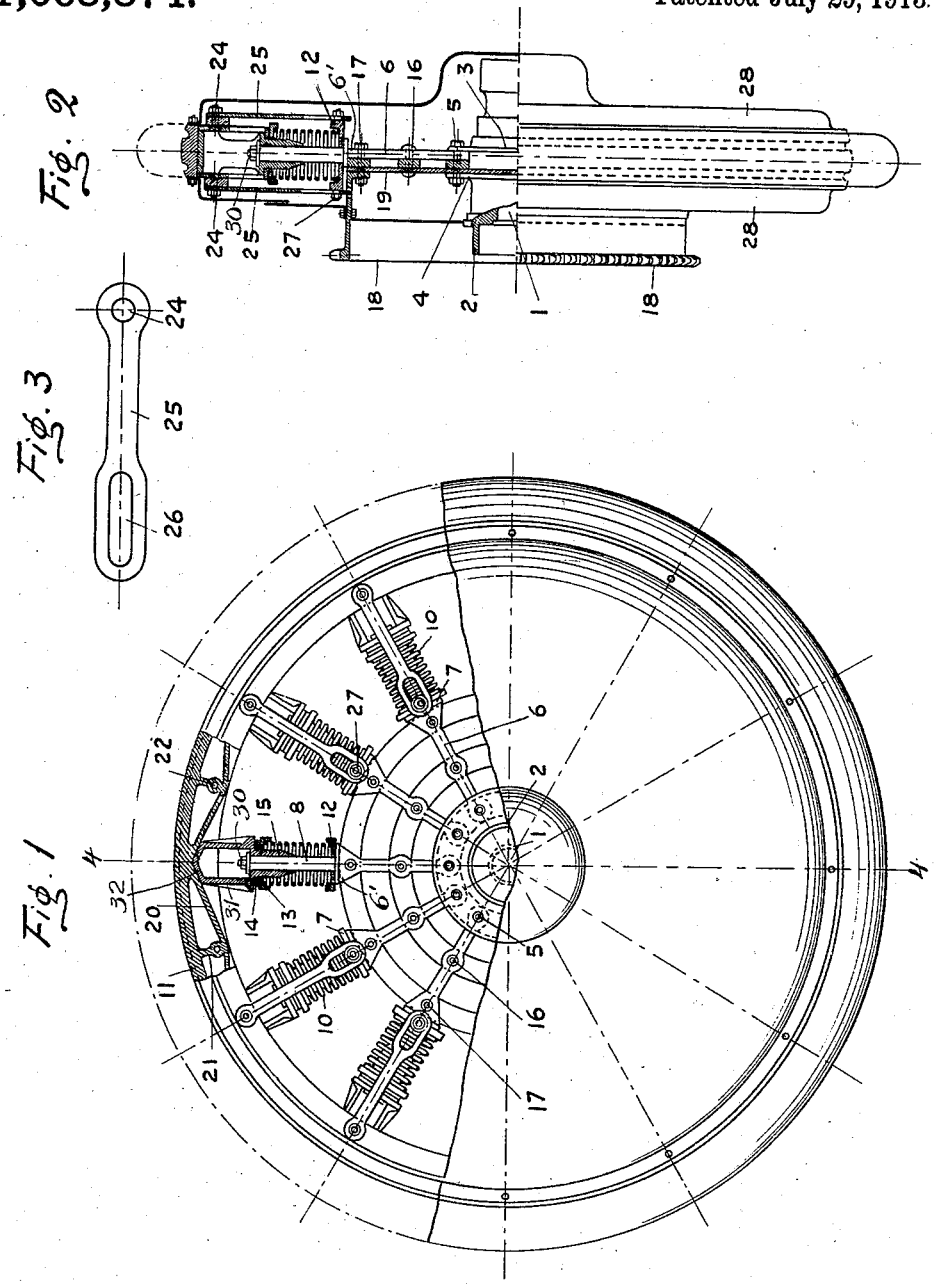

EMILIO FARINA, OF GENOA, ITALY.

SPRING-WHEEL.

1,068,874.            Specification of Letters Patent.         Patented July 29, 1913.

Application filed November 23, 1911. Serial No. 661,977.

*To all whom it may concern:*

Be it known that I, EMILIO FARINA, engineer, a subject of the King of Italy, residing at Genoa, Italy, have invented a useful Improved Spring-Wheel, of which the following is a specification.

My invention relates to an improved spring wheel for all kinds of vehicles intended to replace wheels provided with pneumatic tires and generally all spring suspension of the axles. To this end, the spokes of the wheel forming the subject of the present invention are deformable in the direction of their axes but offer at the same time a very great resistance to any other deformation.

One embodiment of the invention is illustrated by way of example in the annexed drawings in which, Figure 1 shows, partly in section a view of the wheel constructed in accordance with the present invention. Fig. 2 is a horizontal view of the wheel partly in section. Fig. 3 is a view of one of the links which connect the felly of the wheel to the hub.

Like characters of reference designate similar parts throughout the different figures of the drawing.

1 designates an axle on which a hub is mounted. The hub consists of an inner part 2 and a removable outer part 3, which parts are connected together by bolts 5. A disk 19 is also secured by the bolts 5, also secure the inner ends of spokes 6. The spokes 6 are connected with the disk 19 by bolts 16, and also by bolts 17. If the wheel structure is intended as a driving wheel, then a gear 18 may be secured to the disk 19 and spokes 6 by the bolts 17, as clearly indicated in Fig. 2. The spokes 6 are provided with shouldered portions 6′ which converge to the cross section of the lower body portions of the spokes, the upper portions 8 of the spokes being preferably cylindrical and extending somewhat beyond the shouldered portions 6′. A spring bearing plate 12 is mounted on the shouldered portions 6′ and forms a rigid seat for a spring 10 which surrounds the upper portion of the spoke. A plunger 15 is slidably mounted on the upper ends of the spokes 8 and is held against radially outward movement thereon, beyond a given point, by a nut 30. A spring supporting member 13 is threaded on the plunger 15 and the upper end of the spring 10 abuts against the member 13. The adjustability of the member 13 with respect to the plunger 15 affords suitable means for varying the tension of the spring 10. The plunger 13 is provided with a hollow head portion 31 having inclined outer walls 32. The felly 11, which may be provided with any suitable form of tread, has a plurality of symmetrically arranged inclined recess portions 20, which the hollow head 31 engages, the walls 32 of said head being shaped to fit the recess portions 20. Links 25 are pivoted at 24 to the felly, as clearly disclosed in Fig. 2. The links 25 are slotted at their inner ends, as at 26, and are connected by bolts 27 with the bearing plate 12.

It will be seen that the springs 10 are always under compression and that when the hub structure descends with respect to the felly structure, the upper and lower springs will yield under compression. Under load, the hub will move downwardly thereby causing both the lower and upper springs to be compressed, and also causing those springs which are in a horizontal position to be compressed slightly from both ends.

The outside of the felly 11 may be covered with thick rubber or with any other material adapted to deaden sound. The wheel is thus totally inclosed in a casing 28 adapted to be filled with oil for lubricating purposes.

From the above it will be seen that the springs have the function of absorbers and that they re-act against shocks precisely in the same manner as pneumatic tires. In view of the particular arrangement of the felly and the spokes, the springs can only operate in the direction of their axes; they consequently operate under the best possible conditions.

Having now particularly described and ascertained the nature of my said invention and in what manner the same is to be performed, I declare that what I claim is:

A vehicle wheel comprising in combination, a hub, a felly, spokes rigidly connected with the hub, plungers slidable on said spokes and loosely engaging the felly, compression springs having their outer ends abutting against said plungers, spring supports slidably mounted on said spokes and engaging the inner ends of said springs, and links connected at their outer ends with said felly and having slotted engagement with said spring supports, substantially as described.

In testimony whereof I affix my signature in presence of two witnesses.

EMILIO FARINA.

Witnesses:
 ALESSANDRE RIGHI,
 PIO RINALDINI.

---

Copies of this patent may be obtained for five cents each, by addressing the "Commissioner of Patents Washington, D. C."